(12) United States Patent
Breiter et al.

(10) Patent No.: US 9,507,684 B2
(45) Date of Patent: *Nov. 29, 2016

(54) MONITORING SERVICE IN A DISTRIBUTED PLATFORM

(75) Inventors: Gerd Breiter, Wildberg (DE); Sambit Sahu, Hopewell Junction, NY (US); Anca Sailer, Scarsdale, NY (US); Hidayatullah Shaikh, Shrub Oak, NY (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 476 days.

This patent is subject to a terminal disclaimer.

(21) Appl. No.: 13/608,400

(22) Filed: Sep. 10, 2012

(65) Prior Publication Data
US 2013/0007268 A1    Jan. 3, 2013

Related U.S. Application Data

(63) Continuation of application No. 13/112,210, filed on May 20, 2011.

(51) Int. Cl.
*G06F 15/173* (2006.01)
*G06F 11/30* (2006.01)
*G06F 11/07* (2006.01)

(52) U.S. Cl.
CPC ....... *G06F 11/3055* (2013.01); *G06F 11/0709* (2013.01); *G06F 11/3006* (2013.01)

(58) Field of Classification Search
CPC ................................................ G06F 2201/865
USPC ........................................................ 709/224
See application file for complete search history.

(56) References Cited

U.S. PATENT DOCUMENTS

| 8,185,619 | B1* | 5/2012 | Maiocco | H04L 12/6418 |
| | | | | 709/203 |
| 8,504,733 | B1* | 8/2013 | Iyer | G06F 11/3048 |
| | | | | 707/705 |
| 2004/0046785 | A1* | 3/2004 | Keller | G06F 9/5061 |
| | | | | 715/734 |
| 2008/0155089 | A1 | 6/2008 | Hunt et al. | |
| 2010/0083248 | A1 | 4/2010 | Wood et al. | |
| 2010/0106678 | A1 | 4/2010 | Pietrek et al. | |
| 2011/0022560 | A1 | 1/2011 | Breiter et al. | |

OTHER PUBLICATIONS

Tivoli Management Framework, Wikipedia, http://en.wikipedia.org/wiki/IBM_Tivoli_Framework downloaded Feb. 19, 2013.
Risk Management Information System, Wikipedia, http://en.wikipedia.org/wiki/Risk_management_information_systems downloaded Feb. 19, 2013.

* cited by examiner

*Primary Examiner* — Andrew Georgandellis
(74) *Attorney, Agent, or Firm* — Ryan, Mason & Lewis, LLP

(57) ABSTRACT

Techniques for enabling monitoring across one or more domains are provided. The techniques include identifying information technology resources across one or more domains, collecting information technology dependency information relating to the information technology resources identified across one or more domains, collecting monitoring data from the information technology resources identified across one or more domains, and using the dependency information to aggregate the monitoring data into one or more pre-determined metrics.

8 Claims, 2 Drawing Sheets

MONITORING SERVICE IN A DISTRIBUTED PLATFORM

CROSS-REFERENCE TO RELATED APPLICATIONS

This application is a continuation of U.S. patent application Ser. No. 13/112,210 filed May 20, 2011, incorporated by reference herein.

FIELD OF THE INVENTION

Embodiments of the invention generally relate to information technology, and, more particularly, to monitoring services.

BACKGROUND OF THE INVENTION

The emergence of information technology (IT) cloud environments, with their resource virtualization, dynamic allocation, image technology, brings with it a shift from the traditional static IT environment management towards management as a service for dynamic IT environments.

However, challenges arise when trying to manage across IT cloud environments. For example, a challenge exists in providing real-time awareness of the dynamic IT environment changes given the IT cloud promise for scalability, flexibility and seamless provisioning. Also, a challenge exists in providing an end-to-end unified management across different domains from private to public and from local to remote, while being efficient and cost effective.

Existing approaches for IT management include management via agents that cover a limited range of products, agent-less solution management which leverages native management application programming interfaces (APIs) as they are available for products when directly accessible, and remote management that uses remote access and data collection techniques for static IT environments.

The existing approaches, however, include a number of shortcomings when trying to leverage the approaches across domains and in IT cloud environments. For example, existing approaches monitor only a limited range of products, require local connectivity, cannot deal with dynamic IT environments or cross domains, and cannot build an end-to-end (e2e) global view from partial monitoring results.

SUMMARY OF THE INVENTION

Principles and embodiments of the invention provide techniques for a monitoring service in a distributed platform.

An exemplary method (which may be computer-implemented) for enabling monitoring across one or more domains, according to one aspect of the invention, can include steps of identifying information technology resources across one or more domains, collecting information technology dependency information relating to the information technology resources identified across one or more domains, collecting monitoring data from the information technology resources identified across one or more domains, and using the dependency information to aggregate the monitoring data into one or more pre-determined metrics.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
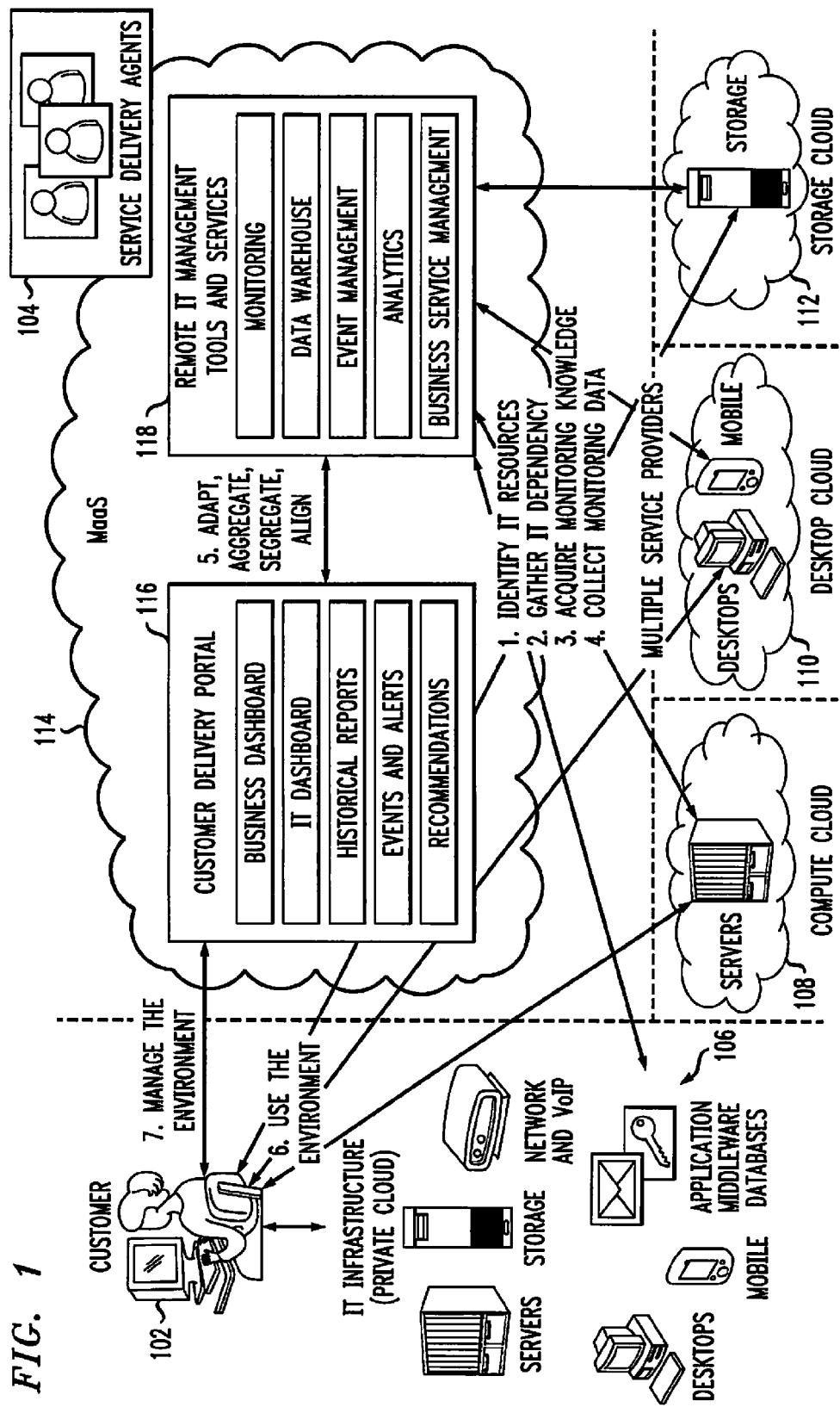
FIG. 1 is a diagram illustrating architecture for monitoring services in distributed platforms, according to an embodiment of the present invention.

Principles of the invention include enabling monitoring as a service in a distributed platform. One or more embodiments of the invention include creating a monitoring service for providing required mechanisms to enable clients using the environment to enable services.

In one or more embodiments of the invention, it can be assumed that services of a client may be hosted by a variety of domains. By way of example, a compute domain, a desktop domain, and a storage domain together may be required to host an enterprise analytics service that Client A wants to host and provide to its customers. Note, also, that Client A can be interested, for example, in providing the monitoring of its service in a meaningful way, but that none of the domains separately provide such a monitoring view.

In order to provide the monitoring view from a client vantage point, one would likely need to collect monitoring information from each domain (that is, the compute, desktop and storage domains individually), and aggregate the collected information into the metrics that a client monitoring view wants. Such action may further require, for example, transforming individual metrics into a form that can be aggregated, discovering unmeasured components and performing additional measurements or using predictive models to provide measures, and combining these individual metrics into client metrics by using service dependency models.

In addition, as each domain provider may dynamically update or change the service deployments for a variety of reasons, the dependent components should be discovered and updated dynamically and the collection and aggregation process should be updated accordingly.

As such, one or more embodiments of the invention include providing control over IT resources that lead to a systematic approach to unified remote IT management.

Additionally, the techniques described herein include generating rules necessary to align available data into meaningful measures, as well providing management methodology for dynamic systems.

Accordingly, and as detailed herein, one or more embodiments of the invention can include the following steps. IT resources across multiple domains are identified, including but not limited to, private and public domains, third-party hosted, static local, etc., and IT dependency relating the identified IT resources is gathered. Also, knowledge is acquired about how to capture monitoring data from, for example, products, self-managed IT entities (for instance, public domains), third-party managed environments, etc., as is knowledge about how to leverage the monitoring data.

Further, one or more embodiments of the invention include collecting monitoring data from environments that are static as well as dynamic across multiple dimensions such as, for example, a count of replicated IT resources in a cluster (for instance, go from 2 WAS to 30 WAS due to a load increase), type of product providing a given functionality (for instance, go from Access database (DB) to DB2 due to a load increase), etc. Additionally, the collected monitoring data is adapted, aggregated and/or segregated to align heterogeneous metrics into meaningful measures. An aggregation process can be guided, for example, by an application dependency graph.

As illustrated in FIG. 1, a service that a client wants to monitor may be composed from a set of cloud hosted applications, possibly on a distributed set of cloud domains with each domain being controlled autonomously by a respective domain owner. In such a situation, a client may require, for example, a monitoring service that can collect relevant information from each domain, perform additional monitoring, and stitch together disparate monitoring information into a meaningful set of monitoring information to present and meet the monitoring requirements of the client.

As noted herein, there are several challenges in such a scenario. For example, gathering information from each domain that may make it amenable to provide e2e monitoring information can prove challenging. Also, the individual domains may not have the required level of information to connect these measured information pieces to provide the monitoring view that a client needs. Further, as noted, in existing approaches, there is no framework to build such e2e views that spans across different domains and works where some information may be missing. One or more embodiments of the invention, however, overcome these challenges.

FIG. 1 is a diagram illustrating architecture for monitoring services in distributed platforms, according to an embodiment of the present invention. By way of illustration, in FIG. 1, component 102 represents the customers (for example, IT department representatives) who request IT management services for their IT environment. Component 104 represents the service delivery agents who assist the deployment of the requested services, acquire the knowledge about how to capture monitoring data from, for example, products, self-managed IT entities (for instance, public clouds/platforms) and third-party managed environments, acquire the knowledge about how to leverage the monitoring data, its meaning, and systematize the knowledge to enable automation when leveraging it across customers.

Component 106 includes the customer's IT infrastructure located on the customer's premises, which may include, for example, network devices, servers, middleware, applications, desktops, storage, communication devices, etc. Additionally, component 108 is an IT compute cloud environment that provides, to the customer, additional IT infrastructure (for example, network devices, servers, middleware, applications, etc.). Also, component 110 is a desktop cloud environment that provides, to the customer, additional desktop services, and component 112 is a storage cloud environment that provides, to the customer, additional storage services.

Further, in FIG. 1, component 114 is the IT cloud environment where the management service (also referred to herein as MaaS) is provided from/to the customers. Component 116 is the customer delivery portal that can include an enterprise dashboard, IT dashboard, historical reports, events, alerts, recommendations, etc. Component 116 serves as the customer interface to the remote IT management tools and services. Also, component 118 represents the remote IT management tools and services.

Component 118 includes but is not limited to the following functionality and processes. For example, component 118 can include the functionality of discovering and identifying the IT resources involved in a customer IT infrastructure, including the local as well as the remote resources. Component 118 functionality can also include gathering IT resource dependencies, supporting the acquisition of knowledge regarding how to capture monitoring data and how to leverage the monitoring data and its meaning, as well as deploying the necessary resources to enable monitoring and management of the customer's IT resources and collecting the monitoring data. Additionally, component 118 can also include the functionality of systematizing the noted acquired knowledge acquired to generate specific data processing rules (such as, but not limited to, data aggregation, segregation, adjustments necessary to align the heterogeneous information collected from the various monitoring data providers (IT resources, agents, management tools, etc.)) in a meaningful way for incident notifications, reporting, etc.

In one or more embodiments of the invention, the step of systematizing the acquired knowledge acquired to generate specific data processing rules can be facilitated by discovering the application/service dependency graph that provides the run-time dependent components for the service. Using such a graph, one or more embodiments of the invention can include combining component-wise monitored information into meaningful e2e monitoring information that a client monitoring view may require. Accordingly, one or more embodiments of the invention include managing this dependency graph and using this to aggregate and translate individually monitored information into MaaS provided information to the aggregated view for clients.

Also, in addition to the above descriptions, component 118 of FIG. 1 can also include the functionality of adapting and updating the noted steps as the cloud dynamically adapts or changes the service deployments.

Figure 2:
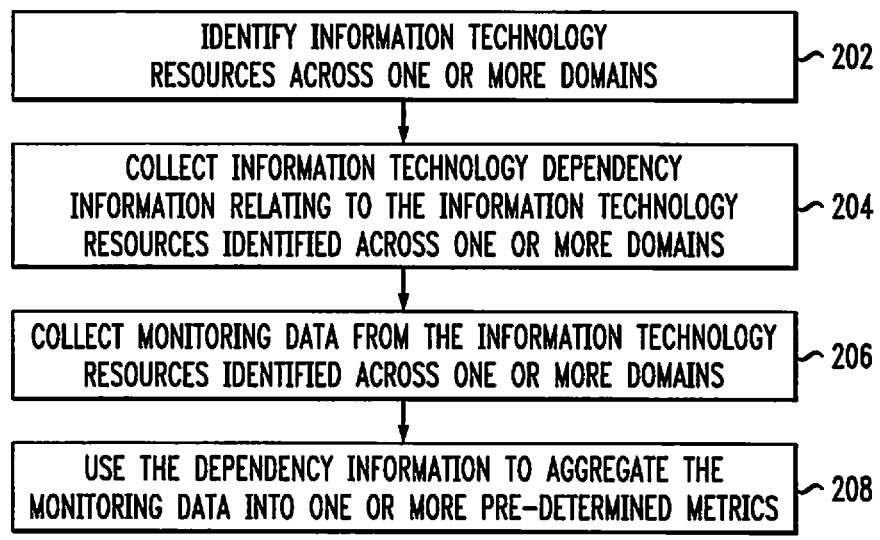
FIG. 2 is a flow diagram illustrating techniques for enabling monitoring across one or more domains, according to an embodiment of the invention.

FIG. 2 is a flow diagram illustrating techniques for enabling monitoring across one or more domains, according to an embodiment of the present invention. Step 202 includes identifying information technology resources across one or more domains. This step can be carried out, for example, using a service delivery agent module and/or a management service module. Information technology resources across one or more domains can include, for example, a private cloud, a public cloud, a third-party hosted domain a static local domain, etc.

Step 204 includes collecting information technology dependency information relating to the information technology resources identified across one or more domains. This step can be carried out, for example, using a service delivery agent module and/or a management service module. Dependency information can include, by way of example, network and platform dependency information, dependent servers and corresponding statistics, etc.

Step 206 includes collecting monitoring data from the information technology resources identified across one or more domains. This step can be carried out, for example, using a service delivery agent module and/or a management service module. Monitoring data can include, for example, count of replicated information technology resources in a cluster, type of product providing a given functionality, dependency information amongst resources, functionality components, etc.

Step 208 includes using the dependency information to aggregate the monitoring data into one or more pre-determined metrics. This step can be carried out, for example, using a management service module and/or a customer delivery portal. Using the dependency information to aggregate the monitoring data into pre-determined metrics can include aggregating the monitoring data into metrics desired by a client monitoring view. Additionally, using the dependency information to aggregate the monitoring data can include using an application dependency graph to aggregate the monitoring data. Further, using the dependency information to aggregate the monitoring includes transforming individual metrics into a form that can be aggregated.

Also, one or more embodiments of the invention include performing one or more measurements on unmeasured components and/or using a predictive model to provide one or more measurements on unmeasured components.

The techniques depicted in FIG. 2 can also include using the aggregated monitoring data to facilitate unified remote information technology management. Additionally, one or more embodiments of the invention include dynamically updating the collection and aggregation steps. Also, the techniques depicted in FIG. 2 can include collecting information pertaining to how to capture monitoring data, collecting information pertaining to how to leverage the monitoring data, as well as generating one or more rules to align the monitoring data into one or more aggregated measures.

The techniques depicted in FIG. 2 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a service delivery agent module, a management service module and a customer delivery portal module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 3:
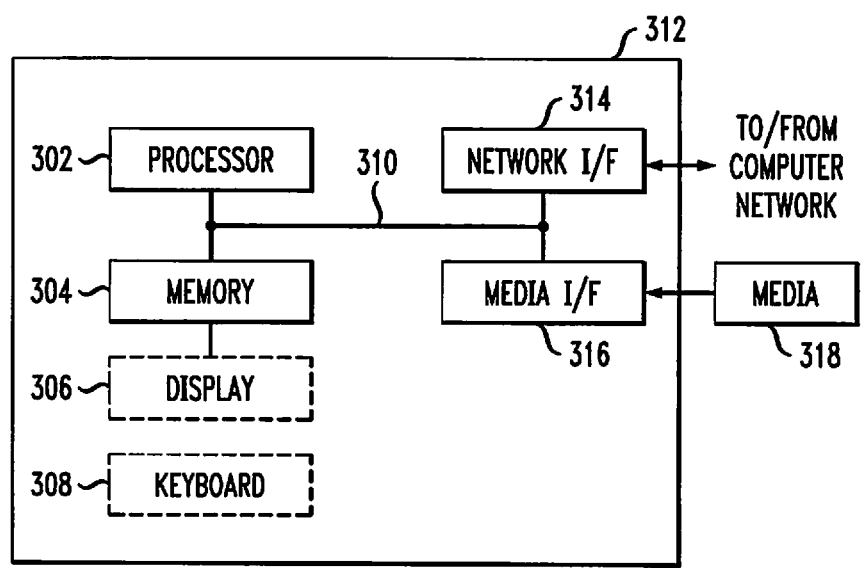
FIG. 3 is a system diagram of an exemplary computer system on which at least one embodiment of the invention can be implemented.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on one or more hardware processors 302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, providing control over IT resources that lead to a systematic approach to unified remote IT management.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for enabling monitoring across one or more domains, wherein the method comprises:

identifying information technology resources across multiple cloud environment domains, wherein said information technology resources correspond to a client service distributed across the multiple cloud environment domains, and wherein each respective one of the multiple cloud environment domains is controlled autonomously by a respective domain owner;

collecting heterogeneous monitoring data from the information technology resources identified across each respective one of the multiple cloud environment domains, wherein said heterogeneous monitoring data comprises at least (i) a count of all replicated information technology resources in a cluster among the identified information technology resources, (ii) an identification of a type of product providing a given functionality among the identified information technology resources, and (iii) dependency information among the identified information technology resources;

combining the heterogeneous monitoring data from the information technology resources corresponding to the client service distributed across the multiple cloud environment domains based on one or more items of the dependency information according to (i) one or more monitoring requirements of the client, and (ii) multiple data processing rules comprising (a) one or more data aggregation rules, (b) one or more data segregation rules, and (c) one or more data alignment adjustment rules to generate a unified set of monitoring data, wherein said combining comprises transforming each respective item of the heterogeneous monitoring data to a predetermined form; and outputting the unified set of monitoring data to the client via a client delivery portal, wherein said client delivery portal comprises (i) a business dashboard, (ii) an Information Technology dashboard, (iii) a historical reports viewer, (iv) an event viewer, (v) a notification viewer, and (vi) a recommendation viewer.

2. The method of claim 1, wherein information technology resources across the multiple cloud environment domains comprise at least one of a private cloud, a public cloud, a third-party hosted domain and a static local domain.

3. The method of claim 1, wherein combining the heterogeneous monitoring data comprises combining the heterogeneous monitoring data into one or more metrics corresponding to the one or more monitoring requirements of the client.

4. The method of claim 1, wherein combining the heterogeneous monitoring data comprises identifying an application dependency graph that comprises multiple run-time components of the client service and combining component-wise monitoring data in accordance with the application dependency graph.

5. The method of claim 1, wherein combining the heterogeneous monitoring data comprises performing one or more measurements on one or more unmeasured components.

6. The method of claim 1, further comprising using the monitoring data to facilitate unified remote information technology management.

7. The method of claim 1, further comprising dynamically updating the collection and combining steps.

8. The method of claim 1, further comprising collecting information pertaining to how to capture heterogeneous monitoring data.

* * * * *